United States Patent [19]
Zhang et al.

[11] Patent Number: 5,924,785
[45] Date of Patent: Jul. 20, 1999

[54] LIGHT SOURCE ARRANGEMENT

[76] Inventors: Lu Xin Zhang, 2855 Pinecreek Dr. C-307, Costa Mesa, Calif. 92626; Long Bao Zhang, Room 301, No. 2, Lane 23, Lan Ling Road, Pudong New Area, Shanghai, China

[21] Appl. No.: 08/861,093

[22] Filed: May 21, 1997

[51] Int. Cl.$^6$ ..................................................... F21V 1/00
[52] U.S. Cl. .......................... 362/241; 362/219; 362/240; 362/244; 362/245; 362/246; 362/249; 362/543; 362/544; 362/545; 362/800; 313/500
[58] Field of Search .................................. 362/219, 240, 362/241, 244, 245, 246, 249, 543, 544, 545, 800

[56] References Cited

U.S. PATENT DOCUMENTS

| | | | |
|---|---|---|---|
| 4,555,749 | 11/1985 | Rifkin et al. | 362/249 |
| 4,628,422 | 12/1986 | Ewald | 362/240 |
| 4,742,432 | 5/1988 | Thillays et al. | 361/400 |
| 4,929,866 | 5/1990 | Murata et al. | 313/500 |
| 4,935,665 | 6/1990 | Murata | 313/500 |
| 5,093,768 | 3/1992 | Obe | 362/241 |
| 5,119,174 | 6/1992 | Chen | 357/80 |
| 5,257,173 | 10/1993 | Ohmamyuda et al. | 362/235 |
| 5,534,718 | 7/1996 | Chang | 257/98 |
| 5,570,951 | 11/1996 | Bertling et al. | 362/231 |
| 5,607,227 | 3/1997 | Yasumoto | 362/249 |
| 5,632,551 | 5/1997 | Roney et al. | 362/249 |
| 5,639,158 | 6/1997 | Sato | 362/247 |
| 5,765,940 | 6/1998 | Levy et al. | 362/240 |
| 5,808,592 | 9/1998 | Mizutani et al. | 345/83 |
| 5,819,454 | 10/1998 | Rosenitsch | 40/524 |

*Primary Examiner*—Sandra O'Shea
*Assistant Examiner*—John Anthony Ward
*Attorney, Agent, or Firm*—David & Raymond; Raymond Y. Chan

[57] ABSTRACT

A light source arrangement includes at least a lighting cell which includes a cell body having a concave light projecting surface and a semi-spherical reflecting cavity surrounded by the concave light projecting surface, a luminary electronic diode cell having two electric terminals extended therefrom, an electrode supporter mounted on the cell body to support the luminary electronic diode cell positioning within reflecting cavity at a focus point of the concave light projecting surface for emitting light towards the concave light projecting surface upon energized, whereby all the emitting light from the luminary electronic diode cell is accumlatively collected and reflected by the concave light projecting surface to provide high intensity light source.

18 Claims, 4 Drawing Sheets

LIGHT SOURCE ARRANGEMENT

FIELD OF THE PRESENT INVENTION

The present invention relates to a high efficiency solid-state light source, and more particular to a shock proof light source arrangement which has longer operating life, instant light emission and low power consumption.

BACKGROUND OF THE PRESENT INVENTION

Lighting source is an important element in modern life. There are two major application for all kinds of lighting source, that is illumination lighting and signal lighting. The most common light sources for signal lighting are filament lamp bulb and LED lighting. Due to the remarkable features of low power consumption and instant light emission, LED lighting is specially adaptable to be utilized in many electrical appliances, such as the power on-off signal light and instructional signal light of electrical equipment, indicating light of electronic clock, and etc.. The filament lamp bulb is usually used for illuminating purposes.

Although LED lighting has excellent properties of low power consumption and instant light emission, the relatively small lighting intensity and lighting emission angle of LED lighting make it not suitable to be applied in some specific area such as traffic light, signboard light, vehicle brake light and signal light, and airport guiding lighting. Therefore, most indicating lighting systems still utilize the filament light bulb as the light source even though it is well known that the conventional filament light bulb bears various shortcomings as follows. The filament light bulb has a relatively large size so that it requires a big housing to receive the bulb therein. The service life span of the filament light bulb is short, usually about 200 to 500 hours only. In other words, the filament inside the light bulb may bum off easily. The light emitting response time of the filament light bulb (i.e. the time required for emitting light upon the filament light bulb is electrified) is longer than the LED lighting for 0.2 to 0.3 seconds. The filament light bulb consumes large power source, at least 20 W to 30 W. The filament light bulb is frangible that it may break easily during vibration, impact or shock.

SUMMARY OF THE PRESENT INVENTION

The primary object of the present invention is to provide a light source arrangement comprising at least a lighting cell which has excellent shock resistant ability and low power consumption property (not more than 4 W).

Another object of the present invention is to provide a light source arrangement having at least a lighting cell which has a service life span of at least ten thousand hours.

It is still another object of the present invention to provide a light source arrangement which comprises at least a lighting cell having a light emitting responsive time (i.e. the time required for emitting light upon energized) within 60×10⁻9 second which is approximately ½₃₀,₀₀₀ time of the filament light bulb which light emitting responsive time is 140×10⁻3 second.

It is still another object of the present invention to provide a light source arrangement comprising a plurality of lighting cell connected in series or in parallel, which is specifically adapted to be used as the lighting source of indicating lighting system, such as traffic light, signboard light, vehicle brake light and signal light, or airport guiding light.

Accordingly, in order to achieve the above objects, the present invention provides a light source arrangement which comprises at least a lighting cell. The lighting cell comprises a cell body having a concave light projecting surface and a semi-spherical reflecting cavity surrounded by the concave light projecting surface, a luminary electronic diode cell having two electric terminals extended therefrom, an electrode supporter mounted on the cell body to support the luminary electronic diode cell positioning within reflecting cavity at a focus point of the concave light projecting surface for emitting light towards the concave light projecting surface upon energized, whereby all the emitting light from the luminary electronic diode cell is accumlatively collected and reflected by the concave light projecting surface to provide high intensity light source, A plurality of such lighting cell can be electrically connected with adjacently in series or in parallel to form the light source arrangement which is able to be installed in various kinds of lamp housing to form the traffic light, brake light, signal light or other indicating light systems.

DETAILED DESCRIPTION OF THE PREFERRED EMBODIMENT

Figure 1:
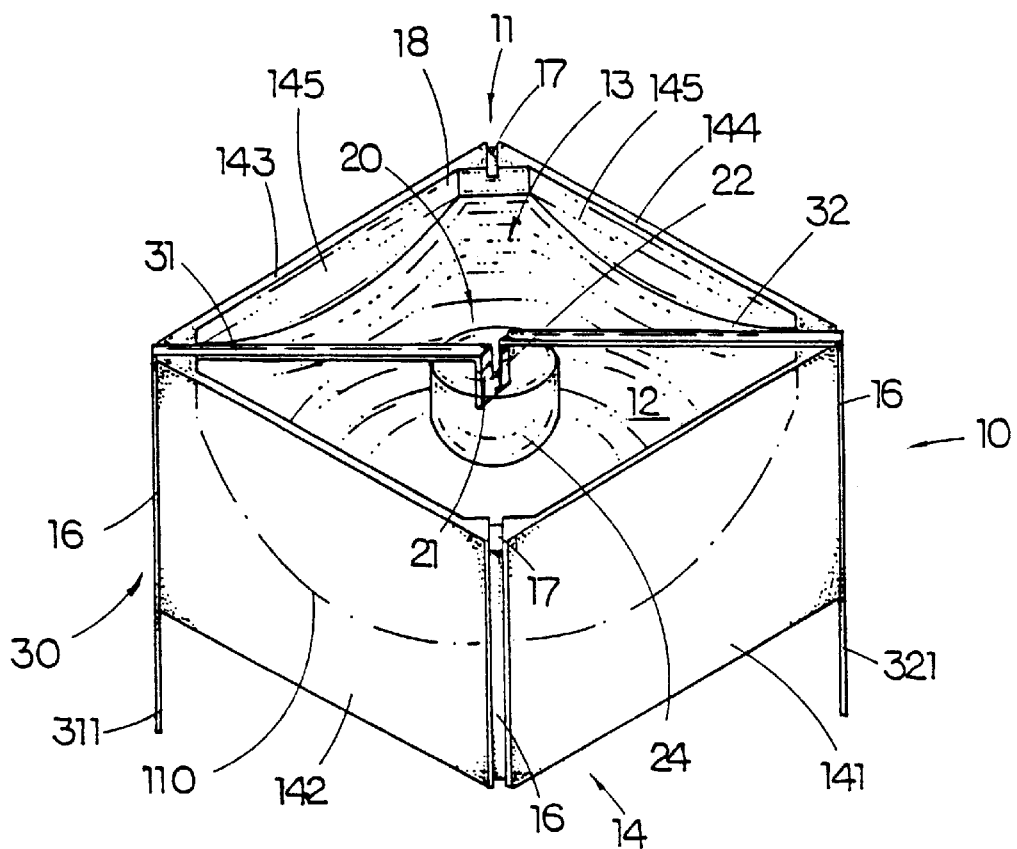
FIG. 1 is a perspective view of a lighting cell according to a preferred embodiment of the present invention.
Figure 2:
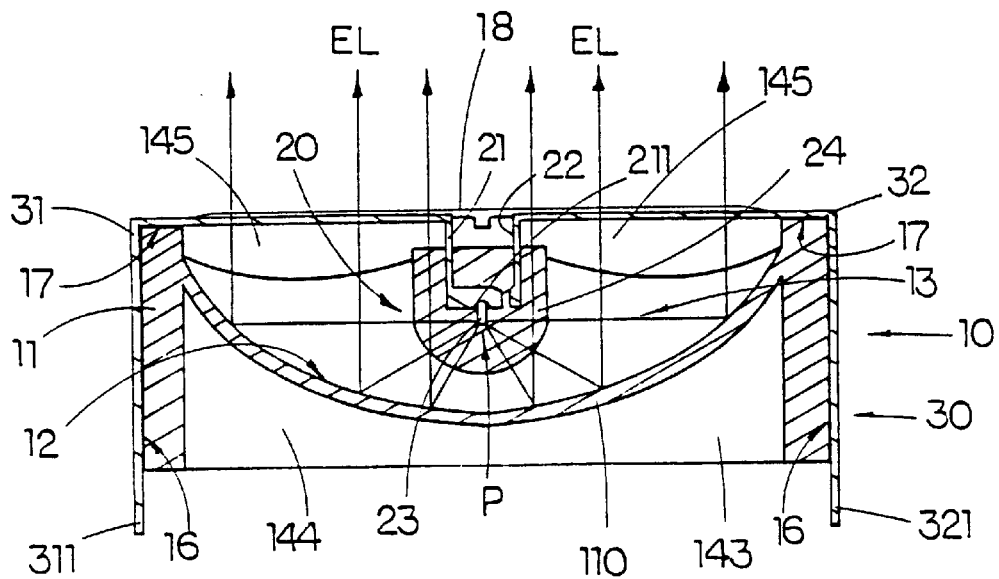
FIG. 2 is a sectional end view of a lighting cell, along A—A' in FIG. 1, according to the above preferred embodiment of the present invention.
Figure 3:
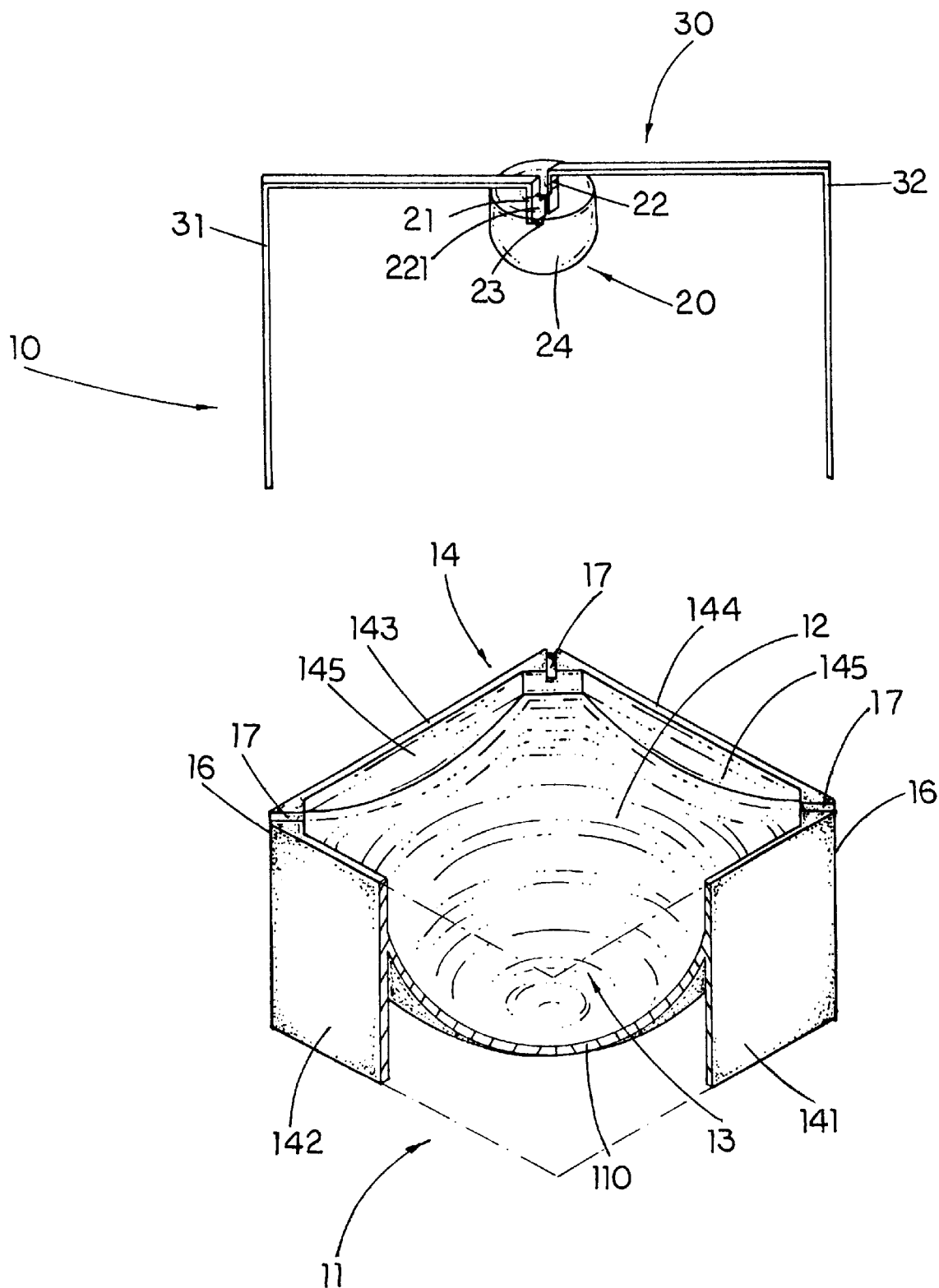
FIG. 3 is a partially sectional exploded view of a lighting cell according to the above preferred embodiment of the present invention.

Referring to FIGS. 1 to 3, the present invention provides a lighting cell 10 which comprises a cell body 11 having a concave light projecting surface 12 and a semi-spherical reflecting cavity 13 surrounded by the concave light projecting surface 12 which is made to reflect all light beams projecting thereon, a luminary electronic diode cell 20 having two terminal electrodes 21, 22 extended therefrom, an electrode supporter 30 mounted on the cell body 11 to support the luminary electronic diode cell 20 positioning within the reflecting cavity 13 at a focus point P of the concave light projecting surface 12 for emitting light towards the concave light projecting surface 12 upon energized, whereby all the emitting light EL from the luminary electronic diode cell 20 is accumlatively collected and reflected by the concave light projecting surface 12 to provide high intensity light source.

According to the preferred embodiment, the cell body 11 comprises a light reflecting bowl 110 and a square supporting frame 14 having four supporting walls 141, 142, 143, 144 integrally and perpendicularly connected corner with corner, in which the light reflecting bowl 110 is integrally connected within the square supporting frame 14. In order words, the light reflecting bowl 110 is extended inwardly and downwardly from the four supporting walls 141, 142, 143, 144 to form a bowl shaped body. Practically, the entire cell body 11 is made by plastic molding injection. In order to achieve the light reflecting ability, an inner semnispherical surface of the light reflecting bowl 110 and four upper inner surfaces 145 of the four supporting walls 141, 142, 143, 144 are coated with a layer of light reflecting material such as aluminum, silver or titanium to form the concave light projecting surface 12 and define the reflecting cavity 13 right above the concave light projecting surface 12. Of course, the whole cell body 11 can also be made by such light reflecting material (aluminum, silver or titanium) by casting.

Figure 4:
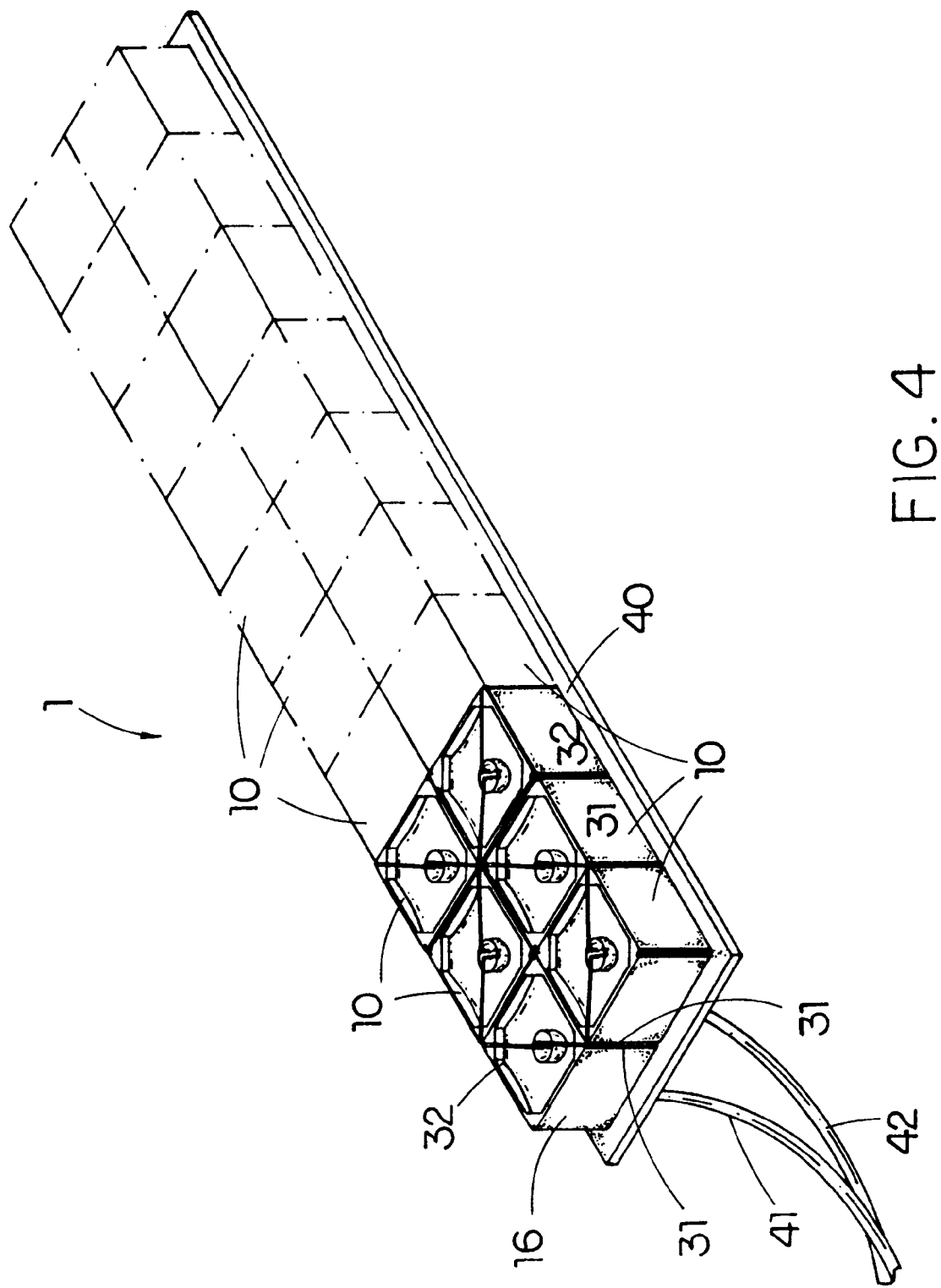
FIG. 4 is a perspective view of a light source arrangement comprising a plurality of lighting cells according to the above preferred embodiment of the present invention.

In fact, the cell body 11 can be any other shape. The main reason of manufacturing the cell body 11 in square shape according to the preferred embodiment is to enable the cell body 11 aligning with another cell body side by side precisely and easily in all direction (as shown in FIG. 4). By means of the square supporting frame 14, the electrode supporter 30 can be mounted thereon for supporting the luminary electronic diode cell 20 at the focus point P of the concave light projecting surface 12 within the reflecting cavity 13.

In accordance with the preferred embodiment of the present invention, as shown in FIG. 2, the luminary electronic diode cell 20 comprises a piece of luminary element 23. One of the vertical terminal electrodes 21, which is horizontally extended to form a reflection bowl 211, is positioned parallelly and closely to another of the vertical terminal electrodes 22. The luminary element 23 which is placed in the reflection bowl 211 and the two terminal electrodes 21, 22 are integrally castled within a semispherical shaped transparent epoxy resin 24 to form the luminary electronic diode cell 20. Therefore, such solid-state luminary electronic diode cell 20 can resist shock and vibration.

The luminary element 23 of the luminary electronic diode cell 20 emits light when the two terminal electrodes 21, 22 are electrified. Practically, different kinds of luminary element 23 can produce different colors of light such as red, blue or green.

Each of the four corners of the square supporting frame 14 is thickened, in which four longitudinal edge slots 16 are respectively provided at four corner edges of the square supporting frame 14 and four transverse top slots 17 are respectively formed on four top corners of the square supporting frame 14. Moreover, according to the present embodiment, the electrode supporter 30 comprises two L-shape electrode wires 31, 32 integrally connected with the two terminal electrodes 21, 22 respectively for being received in two opposite edge slots 16 and top slots 17 so as to mount the luminary electronic diode cell 20 at the focus point P of the light projecting surface 12 within the reflecting cavity 13 in a upside down manner, so that the luminary element 23 of the luminary electronic diode cell 20 is positioned facing towards the light projecting surface 12, as shown in FIG. 2.

In other words, according to the present preferred embodiment, the parts and the manufacturing cost of the lighting cell can be minimized that the electrode supporter 30 is constructed by simply thickening and extending the two terminal electrodes 21, 22 in M shape to form the two L-shape electrode wires 31, 32, wherein each of the electrode wire 31, 32 is extended horizontally to fit the respective top slot 17 and then bending vertically along the respective edge slot 16 until a wire tail 311, 321 thereof exceeding the respective edge slot 16 downwardly. Therefore, the two electrode wires 31, 32 themselves not only support the luminary electronic diode cell 20 in position, but also can conduct electricity to the luminary electronic diode cell 20.

In order to further ensure the luminary electronic diode cell 20 positioning at the focus point P of the light projecting surface 12, the reflecting cavity 13 is filled with transparent epoxy resin 18, as shown in FIGS. 1 and 2, so that the cell body 11, the luminary electronic diode cell 20 and the electrode supporter 30 are united to form a rigid solid body which is durable and shock proof.

As shown in FIG. 2, when the two electrode wires 31, 32 are connected to a power source (not shown) to electrify the luminary electronic diode cell 20, the luminary element 23 emit light beams EL which are projected onto the surrounding light projecting surface 12. Since the luminary element 23 is positioned at the focus point P of the light projecting surface 12, all the light beams EL projected on the light projecting surface 12 will be collected and reflected parallelly away from the light projecting surface 12. Accordingly, the emitting light intensity is greatly enhanced and increased. For example, emitting red light or blue light may have an intensity more than 20 cd and emitting green light may have an intensity more than 10 cd, which are much stronger than the common LED lighting. Besides, the light emission angle of each lighting cell 10 equals to 5 degree only according to the present preferred embodiment.

It should be mentioned that the luminary electronic diode cell 20 of the lighting cell 10 of the present invention may also be any kind of LED by electrically connecting the two electrical terminals thereof with the two electrode wires 31, 32. The lighting intensity of the substitute LED will also be enhanced by the light collecting and accumulating ability of the light projecting surface 12 of the cell body 11.

The lighting cell 10 can be used independently to form a light source arrangement by merely connecting the two wire tails 311, 321 of the two electrode wires to the electrical power source. If stronger lighting is required, the light source arrangement can comprise a plurality of such lighting cell 10 electrically connected adjacently in series or in parallel, which is able to be installed in various kinds of lamp housing to form the traffic light, brake light, signal light or other indicating light systems.

As shown in FIGS. 1, 2 and 4, the light source arrangement 1 of the present invention totally comprises sixteen lighting cells 10 aligned side by side in two rows on a base board 40 (as shown in FIG. 4 wherein some of the lighting cells 10 are simplified to illustrate in broken lines). The wire tail 311, 321 of each electrode wire 31, 32 of each lighting cell 10 is electrically connected with an adjacent electrode wire 31, 32 of another lighting cell 10 adjacently positioned thereto. The utilization of the base board 40 enables all the lighting cell 10 firmly disposed thereon by gluing, moreover all the wire tails 311, 321 of the electrode wires 31, 32 of the lighting cells 10 are arranged penetrating through the base board 40 and are electrically connected in series or in parallel with two electrical wires 41, 42 on the bottom surface of the base board 40. Accordingly, the overall light source arrangement 1 is firmly constructed to form a shock resistant solid body. The light source arrangement 1 of the present invention can be constructed as various shapes, such as square, rhombus or rectangular by selectively arranging different number of rows and columns of lighting cells 10 according to the total light intensity desired.

The base board 40 can be a circuit board with specific circuitry provided thereon to incorporate with the lighting cells 10 so as to provide predetermined functions such as flashing effect or timing control.

Figure 5:
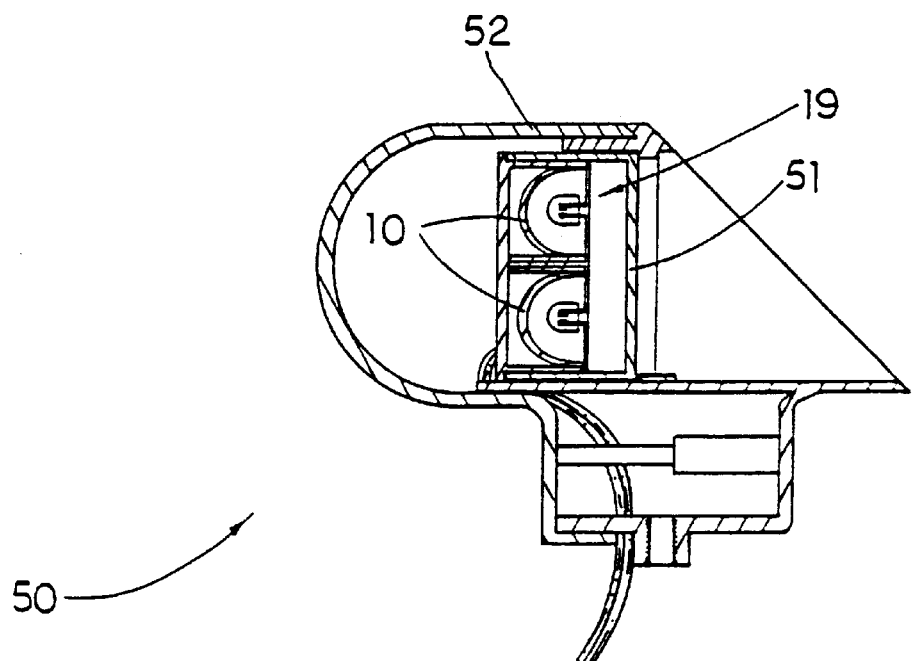
FIG. 5 is a sectional end view of a third brake lamp having the light source arrangement of the present invention installed therein.

Due to the advance features as mentioned above and the instant light emission property of the light source arrangement 1 constituted by the lighting cells 10 of the present invention, the light source arrangement is adapted for embodying in various indicating signal systems. As shown in FIG. 5, a third brake lamp 50 is illustrated, in which a light source arrangement 1 as illustrated in FIG. 4 is installed therein. For third brake lamp 50, a protective light shade 51 is mounted on the housing 52. It is worth to mentioned that a brake lamp with the light source arrangement 1a installed therein is more safer than conventional brake lamp. The instant light emission speed of the lighting cell 10 of the light source arrangement 1 of the present invention is about $60\times10^{-9}$ second which is approximately $1/230,000$ time of the filament light bulb which light emitting responsive time is $140\times10^{-3}$ second. Consequently, the instant light emission speed of the lighting cell 10 is faster than the filament light bulb for 0.3 second, so that the driver after a vehicle having a brake lamp installed with the present invention may observe the brake lighting earlier. In other words, if the vehicle speed is 100 kmn/hr, the safety distance will be increased in 5.6 to 8.3 m.

Figure 6:
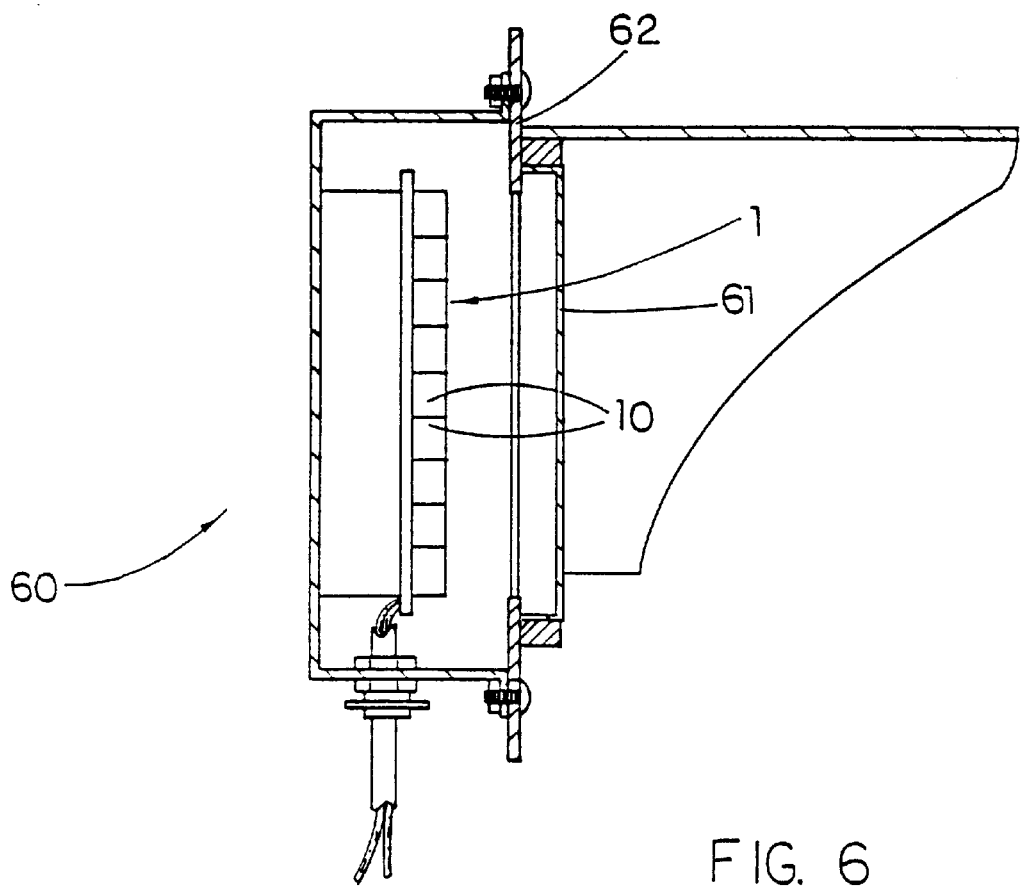
FIG. 6 is a sectional end view of a traffic lamp having the light source arrangement of the present invention installed therein.

Furthermore, as shown in FIG. 6, a traffic lamp 60 having a light source arrangement 1 and a protective shade 61 installed in a lamp housing 62 is illustrated, wherein more rows and columns of lighting cells 10 are utilized to increase the visibility for drivers far away. In fact, the more far the distance from the light source arrangement of the present invention, the brighter lighting may observed by the drivers, so that the shortcoming of fading out of the filament light bulb is improved.

In fact since the lighting cells 10 of the light source arrangement 1 can provide red light directly, the protecting light shade 51 of the brake lamp 50 needn't be in red color or can even be omitted. On the contrary, since every the conventional brake lamp uses the filament light bulb which can merely provide white light, a red cover must be used. In addition, since the lighting cells 10 of the present invention can provides desired red, yellow or green color, the protective shade 61 of the traffic lamp 60 also does not required to be colored. However, the filament light bulb of the conventional traffic lamp can only provide white light, therefore colorful protective shading cover must be used. Moreover, the overall thickness of the brake lamp or traffic lamp can be reduced due to the thinner thickness of the lighting cells 10 of the light source arrangement 1 while all filament light bulb requires a receiving chamber to installed.

Besides, the light source arrangement of the present invention further has the advantages of low power consumption (not more than 4 W) and long service life span (at least ten thousand hours) when comparing with the filament light bulb.

What is claimed is:

1. A light source arrangement comprising at least a lighting cell which comprises a cell body having a concave light projecting surface and a semi-spherical reflecting cavity surrounded by said concave light projecting surface which is adapted for reflecting an emitting light projecting therefrom, a luminary electronic diode cell having a first and a second terminal electrode extended therefrom, an electrode supporter mounted on said cell body for supporting said luminary electronic diode cell positioning within said reflecting cavity at a focus point of said concave light projecting surface for emitting light towards said concave light projecting surface upon energized, and that all emitting light from said luminary electronic diode cell is accumulatively collected and reflected by said concave light projecting surface to provide high intensity light source.

2. A light source arrangement, as recited in claim 1, wherein said cell body comprises a light reflecting bowl integrally connected within a supporting frame, an inner semi-spherical surface of said light reflecting bowl is made of a light reflecting material to form said concave light projecting surface and define said reflecting cavity right above said concave light projecting surface, wherein said electrode supporter is firmly mounted on said supporting frame.

3. A light source arrangement, as recited in claim 2, wherein a transparent epoxy resin is filled in said reflecting cavity to affix said luminary electronic diode cell in position.

4. A light source arrangement, as recited in claim 2, wherein said luminary electronic diode cell comprises a piece of luminary element, one end of said first terminal electrode horizontally extending to form a reflection bowl and one end of said second terminal electrode positioning parallelly and closely to said first terminal electrode, said luminary element being placed in said reflection bowl and being positioned at said focus point of said concave light projecting surface, wherein said luminary element and second terminal electrodes are integrally castled within a semi-spherical shaped transparent epoxy resin to form said luminary electronic diode cell.

5. A light source arrangement, as recited in claim 4, wherein a transparent epoxy resin is filled in said reflecting cavity to affix said luminary electronic diode cell in position.

6. A light source arrangement, as recited in claim 2, wherein said electrode supporter comprises two L-shape electrode wires integrally connected with said two terminal electrodes of said luminary electronic diode cell respectively and said luminary electronic diode cell is positioned in a upside down manner at said focus point of said concave light projecting surface.

7. A light source arrangement, as recited in claim 6, wherein said two terminal electrodes are respectively thickened and extended in M shape to form said two electrode wires, said luminary electronic diode cell comprising a piece of luminary element, one end of said first terminal electrode horizontally extending to form a reflection bowl and one end of said second terminal electrode positioning parallelly and closely to said first terminal electrode, said luminary element being placed in said reflection bowl and being positioned at said focus point of said concave light projecting surface, wherein said luminary element and second terminal electrodes are integrally castled within a semi-spherical shaped transparent epoxy resin to form said luminary electronic diode cell.

8. A light source arrangement, as recited in claim 6, in which said supporting frame comprises four supporting walls integrally and perpendicularly connected corner with corner, wherein said light reflecting bowl is extended inwardly and downwardly from said four supporting walls to form a bowl shaped body, wherein two opposite longitudinal edge slots are respectively provided at two opposite corner edges of said supporting frame and two opposite transverse top slots are respectively formed on two opposite top corners of said supporting frame, so that said two electrode wires are respectively extended horizontally to fit said two opposite top slots and then bending vertically along said two opposite edge slots until a wire tail of each of said electrode wires exceeding said respective edge slot downwardly.

9. A light source arrangement, as recited in claim 8, wherein said two terminal electrodes are respectively thickened and extended in M shape to form said two electrode wires, said luminary electronic diode cell comprising a piece of luminary element, one end of said first terminal electrode horizontally extending to form a reflection bowl and one end of said second terminal electrode positioning parallelly and closely to said first terminal electrode, said luminary element being placed in said reflection bowl and being positioned at said focus point of said concave light projecting surface, wherein said luminary element and second terminal electrodes are integrally castled within a semi-spherical shaped transparent epoxy resin to form said luminary electronic diode cell.

10. A light source arrangement, as recited in claim 9, wherein a transparent epoxy resin is filled in said reflecting cavity to affix said luminary electronic diode cell in position.

11. A light source arrangement, as recited in claim 10, wherein said supporting frame is in square shape and has four thickened corners, another two opposite longitudinal edge slots being provided at another two opposite corner edges and another two opposite transverse top slots being provided at another two opposite top corners.

12. A light source arrangement, as recited in claim 1, wherein said light source arrangement comprises a plurality of lighting cells aligned and affixed side by side, said wire tail of each said electrode wire of each of said lighting cells being electrically connected with said wire tail of another of said lighting cells positioning adjacent thereto.

13. A light source arrangement, as recited in claim 12, wherein said plurality of lighting cells are aligned and affixed side by side on a base board.

14. A light source arrangement, as recited in claim 8, wherein said light source arrangement comprises a plurality of lighting cells aligned and affixed side by side, said wire tail of each said electrode wire of each of said lighting cells being electrically connected with said wire tail of another of said lighting cells positioning adjacent thereto.

15. A light source arrangement, as recited in claim 14, wherein said plurality of lighting cells are aligned and affixed side by side on a base board.

16. A light source arrangement, as recited in claim 9, wherein said light source arrangement comprises a plurality of lighting cells aligned and affixed side by side on a base board, said wire tail of each said electrode wire of each of said lighting cells being electrically connected at a bottom surface of said base board with said wire tail of another of said lighting cells positioning adjacent thereto.

17. A light source arrangement, as recited in claim 10, wherein said light source arrangement comprises a plurality of lighting cells aligned and affixed side by side on a base board, said wire tail of each said electrode wire of each of said lighting cells being electrically connected at a bottom surface of said base board with said wire tail of another of said lighting cells positioning adjacent thereto.

18. A light source arrangement, as recited in claim 11, wherein said light source arrangement comprises a plurality of lighting cells aligned and affixed side by side on a base board, said wire tail of each said electrode wire of each of said lighting cells being electrically connected in parallel at a bottom surface of said base board with said wire tail of another of said lighting cells positioning adjacent thereto.

\* \* \* \* \*